J. C. DUJAT.
SPIGOT.
APPLICATION FILED MAR. 5, 1913.
1,087,001.
Patented Feb. 10, 1914.
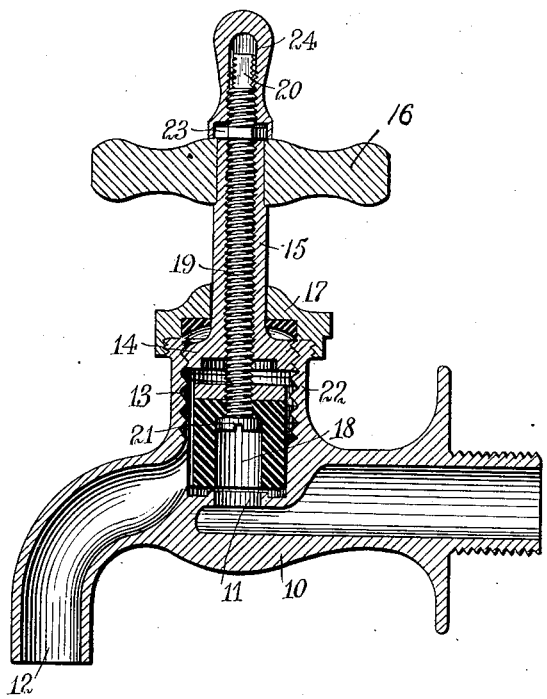
WITNESSES
C. J. Hackenberg
Geo. L. Beeler
INVENTOR
John Charles Dujat
BY Munn & Co
ATTORNEYS

UNITED STATES PATENT OFFICE.

JOHN CHARLES DUJAT, OF NEW YORK, N. Y., ASSIGNOR OF ONE-HALF TO ARTHUR F. WENIGE, OF NEW YORK, N. Y.

SPIGOT.

1,087,001.   Specification of Letters Patent.   Patented Feb. 10, 1914.

Application filed March 5, 1913.   Serial No. 752,054.

*To all whom it may concern:*

Be it known that I, JOHN CHARLES DUJAT, a citizen of the United States, and a resident of the city of New York, Corona, borough of Queens, in the county of Queens and State of New York, have invented a new and Improved Spigot, of which the following is a full, clear, and exact description.

This invention relates to water distribution and has particular reference to valves or spigots for ordinary household or everyday use.

Among the objects of the invention is to provide a spigot with an improved gasket construction whereby the gasket may be changed or reset from time to time without the necessity of cutting off the water supply or taking the spigot apart.

More specifically stated this construction includes a gasket of peculiar form and secured to the main follower of the spigot by means whereby it may be adjusted as occasion may be required from the outside of the spigot construction.

The foregoing and other objects of the invention will be hereinafter more fully set forth and illustrated in the accompanying drawing which is a vertical sectional view of a preferred embodiment of the invention.

The main part of the spigot comprising a body 10 is or may be of the usual construction having a valve seat 11 leading to a downwardly directed mouth 12. The body also includes the usual internally threaded boss 13 in which the follower 14 is operated up or down to open or close the spigot. Said follower, as usual, has an upwardly extending stem 15 and a head 16 whereby the follower is rotated, and a packing gland 17 is fitted around the stem 15, and being screw threaded upon the rim of the boss, normally makes a watertight joint for this portion of the spigot when the valve is open as usual. In this instance the follower 14 is shown relatively short, and instead of the usual gasket being secured directly thereto for coöperation with the valve seat 11, the gasket 18 is made relatively longer and is secured to the follower through an adjustment screw 19 which extends all the way through and beyond the upper end of the stem 15, the extreme upper end of the screw being made polygonal at 20 for the application of a wrench for the making of the adjustments.

The gasket 18 is made preferably in the form of a hollow cylinder having a closed end through which the screw 19 is passed, the head 21 of the screw being seated within the cylinder and against said end. A lock nut 22 is screwed tightly down upon the end of the gasket opposite the head 21, constituting a means for securing the gasket rigidly and permanently to the screw. The lower end or surface of the gasket coöperates in the usual manner with the valve seat 11.

When the gasket is new the screw supporting it will be located well up with the lock nut 22 against or close to the lower surface of the follower. When, however, the gasket becomes worn and needs to be reset it is only necessary, to make the desired adjustment, for any member of the household to apply a tool to the end 20 of the screw, turning the same downwardly far enough to make the gasket operative for its purpose. After each adjustment of the screw 19, I prefer to lock it and the gasket in fixed position by means of a lock nut 23, which serves also to prevent accidental displacement of the head 16 from the stem. A cap 24 also is preferably employed which is screwed upon the upper end of the screw 19 housing the same and the lock nut 23. Said cap is preferably finished and plated to conform to the finish of the fixture as a whole, making therewith a very neat appearance and providing additional security against accidental or malicious tampering with the adjustment of the valve. A valve structure made in accordance with this invention will last for a number of years under ordinary conditions, but when the gasket 18 becomes worn out a new one may be put in its place with no more trouble than is incident to the renewing of an ordinary flat washer or gasket which will last for only a few weeks.

Having thus described my invention, I claim as new and desire to secure by Letters Patent:

In a device of the character set forth, the combination with a spigot body including an annular valve seat and a threaded boss, of a follower operating in said boss and having a hollow threaded stem, means to adjust the stem and follower, a hollow cylindrical gasket between the follower and the valve seat, said gasket having one end closed, the open end of the gasket coöperating with said valve seat, and means to secure the gasket in place with respect to the follower and providing for adjustment thereof independently of the adjustment of the follower, said securing means comprising a screw passing through the closed end of the gasket and through said stem, said screw having a head within the gasket on one side of its closed end, and a lock nut on the screw on the outside of said closed end, said screw extending beyond the stem and having a polygonal end for manipulation thereof and the gasket.

In testimony whereof I have signed my name to this specification in the presence of two subscribing witnesses.

JOHN CHARLES DUJAT.

Witnesses:
 GEO. L. BEELER,
 OSCAR T. WENIGE.

Copies of this patent may be obtained for five cents each, by addressing the "Commissioner of Patents, Washington, D. C."